United States Patent [19]

Uruta et al.

[11] 4,296,705

[45] Oct. 27, 1981

[54] PNEUMATIC MARINE FENDER

[75] Inventors: Hisanari Uruta, Tokyo; Kaneaki Takahashi, Yokohama; Hirotsugu Masuda, Yokohama; Tomoyuki Kurata, Yokohama, all of Japan

[73] Assignee: Bridgestone Tire Co., Ltd., Tokyo, Japan

[21] Appl. No.: 16,705

[22] Filed: Feb. 28, 1979

[30] Foreign Application Priority Data

Mar. 3, 1978 [JP] Japan .................................. 53/23601

[51] Int. Cl.³ .............................................. B63B 59/02
[52] U.S. Cl. .................................... 114/219; 405/212; 267/140
[58] Field of Search ................ 267/140; 405/212, 213, 405/214, 215, 216; 152/330 R, 354 R, 356 R; 114/219, 220

[56] References Cited

U.S. PATENT DOCUMENTS 3,063,400 11/1962 Yamaguchi ........................ 114/219
3,964,422 6/1976 Boyd .................................... 114/219

Primary Examiner—Trygve M. Blix
Assistant Examiner—D. W. Keen
Attorney, Agent, or Firm—Sughrue, Mion, Zinn, Macpeak and Seas

[57] ABSTRACT

A pneumatic marine fender composed of a cylindrical barrel serving as a shock receiving face, which comprises a composite inner reinforcement composed of two kinds of cord layers which consist of an axially extending cord layer and a circumferentially extending cord layer whose cords are slightly inclined and symmetrically arranged with respect to the circumferential line of the cylindrical shell in reverse directions and helically wound around the cylindrical shell.

2 Claims, 6 Drawing Figures (Energy Absorption Compressive Ability Curve)

PNEUMATIC MARINE FENDER

BACKGROUND OF THE INVENTION

1. Field of the Invention

This invention relates to a pneumatic marine fender composed of a cylindrical barrel serving as a shock receiving face and a method of manufacturing the same.

2. Description of the Prior Art

The above mentioned kind of pneumatic marine fender composed of a cylindrical barrel consists of a hollow cylindrical shell. The cylindrical barrel is inflated by applying an internal pressure therein and fitted to a ship's side or quay and floated on the sea for the purpose of absorbing the dynamic energy arising during the contact between two ships or during the berthing of a ship on being moored to a floating body or quay. Such pneumatic marine fender makes use of its cylindrical barrel of the hollow cylindrical shell as a shock receiving face and can be made expansible and contractible by inflating and deflating it, if necessary, and hence is particularly adapted to be folded and stored in a simple and convenient manner.

Conventional pneumatic marine fender is formed of rubber or rubber-like elastic material and comprises an inner reinforcing layer which is mainly arranged in the following two manners:

(1) Two rubberized cord layers are arranged in axial and circumferential directions of the cylindrical barrel, respectively.

(2) Two rubberized cord layers are inclined at an angle of about 55° and symmetrically arranged with respect to the axial direction of the cylindrical barrel in reverse directions.

In the former conventional pneumatic marine fender, the cords of the circumferentially extending cord layer are joined together to form seams of an endless layer. Such seams have a low tension withstanding ability, and as a result, if the cylindrical barrel is subjected to load, the seams become excessively elongated. As a result, there is a risk of a distance, between adjacent cords of the axially extending cord layer, being enlarged or there is a risk of adjacent rows of the cords of the axially extending cord layer being disturbed, thereby inducing a premature puncture failure of the marine fender. In addition, during shaping of the cylindrical barrel in a vulcanization mold, the elongation at the seams results in an irregular distance between adjacent cords of the axially extending cord layer, thereby making quality of the marine fender irregular.

In the latter conventional pneumatic marine fender, even though it is possible to improve the durability thereof, the energy absorption compressive ability becomes inferior to that of the former conventional pneumatic marine fender.

SUMMARY OF THE INVENTION

An object of the invention, therefore, is to provide a pneumatic marine fender composed of a cylindrical barrel serving as a shock receiving face, which can exhibit an excellent energy absorption compressive ability which is comparable to that of the above mentioned former conventional pneumatic marine fender and which can exhibit a berthing shock resistant property or durability which is equal or superior to that of the above mentioned latter conventional pneumatic marine fender.

A feature of the invention is the provision of a pneumatic marine fender composed of a cylindrical barrel serving as a shock receiving face, comprising a hollow cylindrical shell formed of rubber or rubber like elastic material and a composite inner reinforcement composed of two kinds of cord layers which consist of an axially extending cord layer and a circumferentially extending cord layer whose cords are slightly inclined and symmetrically arranged with respect to the circumferential line of the cylindrical shell in reverse directions and helically wound around the cylindrical shell.

Another feature of the invention is the provision of a method of manufacturing a pneumatic marine fender composed of a cylindrical barrel serving as a shock receiving face, comprising a step of forming a hollow cylindrical shell in which axially extending cord layer including a number of cords toroidally arranged in parallel to a center axis of the cylindrical shell, a circumferentially extending cord layer including even number of cords slightly inclined and symmetrically arranged with respect to the circumferential line of the cylindrical shell in reverse directions and helically wound around the cylindrical shell and inner and outer surface rubber layers are bonded together into the hollow cylindrical shell, and a step of hardening and making the hollow cylindrical shell into one integral body in a vulcanization mold in which the hollow cylindrical shell is put in the vulcanization mold and heated under an inflated condition and vulcanized.

Further objects and features of the invention will be fully understood from the following detailed description with reference to the accompanying drawings, in which:

DETAILED DESCRIPTION OF THE PREFERRED EMBODIMENT

Figure 1:
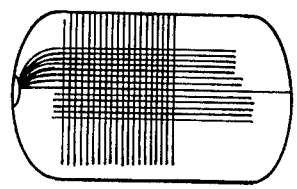
FIGS. 1 and 2 are front elevational views of two kinds of conventional pneumatic marine fenders.

FIG. 1 shows a conventional pneumatic marine fender in which cords of two rubberized cord layers are arranged in the axial and circumferential directions of a cylindrical barrel, respectively.

Figure 2:
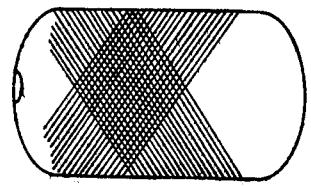

FIG. 2 shows another conventional pneumatic marine fender in which cords of two rubberized cord layers are inclined at an angle of about 55° and symmetrically arranged with respect to the axial direction of the cylindrical barrel in reverse directions.

As described above, in the former conventional pneumatic marine fender shown in FIG. 1, opposed ends of each circumferential extending cord are connected together to form an endless cord having a seam. The seam has a low tension withstanding ability and hence becomes considerably elongated when subjected to load, thereby inducing a premature puncture failure as described above. On the other hand, the latter conventional pneumatic marine fender shown in FIG. 2 has the drawback that the energy absorption compressive ability shown by a curve B in FIG. 3 is considerably smaller than that of the former conventional marine fender shown by a curve A in FIG. 3.

In the present invention, in order to effectively eliminate local concentration of elongation into the seam of the circumferentially extending cord layer, use is made of even number of circumferentially extending cord layers and the cords of these circumferentially extending cord layers are slightly inclined and symmetrically arranged with respect to the circumferentially line of the hollow cylindrical shell.

Figure 3:
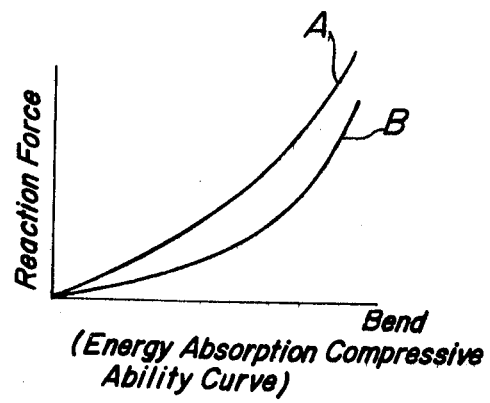
FIG. 3 is a graph of energy absorption compressive ability curves of the conventional pneumatic marine fenders shown in FIGS. 1 and 2, respectively, each curve showing a relation between a reaction force arising during the berthing of a ship and a bend of the marine fender.

Experimental tests have demonstrated the result that if the cords of the circumferentially extending cord layer of a pneumatic marine fender are inclined at an angle of the order of smaller than 30° with respect to the circumferential line of the cylindrical barrel, the pneumatic marine fender can exhibit the energy absorption compressive ability shown by the curve A in FIG. 3 and is capable of effectively dispersing the local elongation to be concentrated into the seam of the cords of the circumferentially extending cord layer.

As a result, if the cords of the circumferentially extending cord layer are slightly inclined and arranged symmetrically with respect to the circumferential line of the cylindrical barrel in reverse directions, it is not always necessary to use even number of these cord layers. For example, use may be made of one circumferentially extending cord layer and the cords thereof may be slightly inclined and arranged symmetrically with respect to the circumferential line of the cylindrical barrel in reverse directions in the case of vulcanization under pressure. But, for the sake of convenience of manufacture, it is preferable to paste together plural circumferentially extending cord layers.

The cord may be formed of organic fiber such, for example, as nylon, rayon, polyester or the like, metals such, for example, as a steel wire, steel stranded wire or the like and may be used with the aid of means of improving the bonding property of the cord with rubber or rubber like elastic material.

As the rubber or rubber-like material, use may be made of natural rubber, synthetic rubber such as styrene butadiene rubber or the like or blend of these rubbers. It is preferable to provide a cylindrical barrel having an outer surface formed of a cut resistant and weather resistant rubber and an inner surface formed of a rubber having a high resistance to gas penetration.

Figure 4:
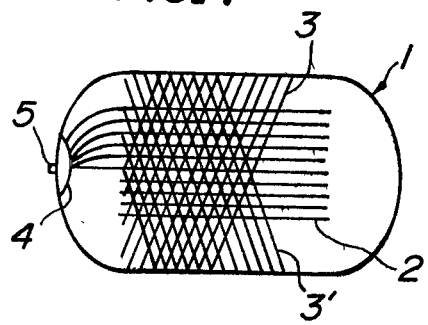
FIG. 4 is a front elevational view of a pneumatic marine fender according to the invention.

FIG. 4 shows a typical embodiment of a pneumatic marine fender according to the invention showing a cord arrangement of an inner reinforcement in an enlarged scale. Referring to FIG. 4, reference numeral 1 designates a marine fender, 2 an axially extending cord layer, 3, 3' circumferentially extending cord layers, 4 a metal fitting ring for firmly securing a turn-back portion of the axially extending reinforcing cord layer 2 and 5 an air valve.

Test pieces of the pneumatic marine fender 1 shown in FIG. 4 and having the following two different dimensions are manufactured.

(1) Outer diameter 200 mm
 Axial length 300 mm
 Cords of the circumferentially extending cord layers 3, 3' are inclined at an angle of 19° and symmetrically arranged with respect to the circumferential line of the cylindrical barrel in reverse directions.

(2) Outer diameter 600 mm
 Axial length 1,200 mm
 Cords of the circumferentially extending cord layers 3, 3' are inclined at an angle of 20° and symmetrically arranged with respect to the circumferential line of the cylindrical barrel in reverse directions.

Experimental tests on the above two test pieces of the pneumatic marine fender according to the invention have yielded the result that both the test pieces exhibit excellent energy absorption, compressive ability and shock resistant property.

In the case of manufacturing the former test piece, use is made of a drum adapted to be used in the case of molding a pneumatic green tire and composed of two halves formed into one integral body, the drum having an expansible and contractible outer diameter. About the drum are superimposed an inner surface rubber, an axially extending cord layer including cords arranged in parallel to the center axis of the drum, circumferentially extending cord layers including cords slightly inclined and arranged symmetrically with respect to the circumferential line of the drum in reverse directions and an outer surface rubber in successin in the order as mentioned above and then the drum is expanded until the cords of the circumferentially extending cord layers are inclined at an angle of 19° with respect to the circumferential line of the drum. Each end of the cords of the axially extending cord layer is wound around the metal fitting ring 4 from the inside toward the outside thereof to form a turn-back portion and subsequently the end surface of the drum is subjected to a working of covering the turn-back portion with the outer surface rubber, thereby forming a green case. Subsequently, the drum is contracted to reduce its outer diameter, thereby permitting to extract the green case therefrom.

In the case of manufacturing the latter test piece, use is made of a mold in which an outer surface rubber, two circumferentially extending cord layers whose cords are slightly inclined and arranged symmetrically with respect to the circumferential line in reverse directions, an axially extending cord layer whose cords extend in parallel to the center axis of the mold and an inner surface rubber are pasted together into one integral body and at the same time each end surface inclusive of the turn-back portion of the axially extending cord layer is reinforced to form a green case in the mold.

Figure 5:
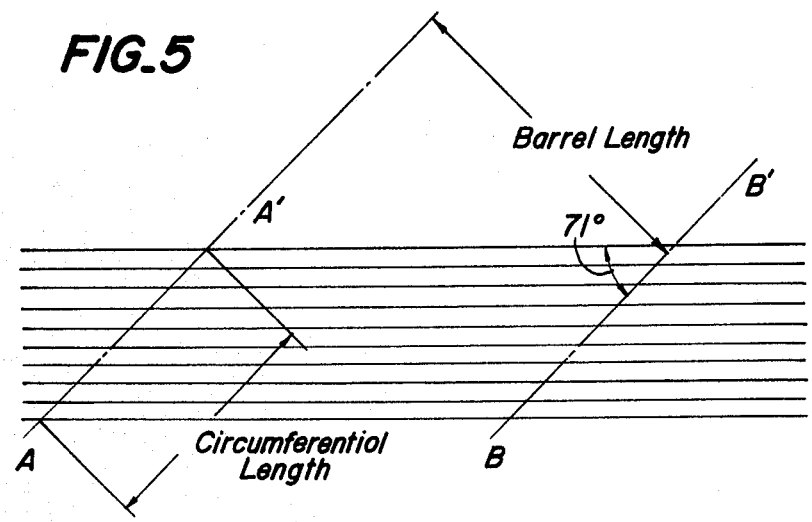
FIGS. 5 and 6 are diagrammatic views illustrating successive steps of a method of manufacturing the pneumatic marine fender according to the invention shown in FIG. 4.

In the case of manufacturing both the test pieces, the circumferentially extending cord layers surrounding the axially extending cord layer including cords extending in parallel to the center axis of the cylindrical barrel and including cords slightly inclined and symmetrically arranged with respect to the circumferential line in reverse directions are obtained by cutting parallel cords along inclined lines spaced apart from each other by a distance which is equal to the barrel length of the cylindrical barrel and inclined at an angle of 71° with respect to the axial direction of the cords, as shown in FIG. 5.

Figure 6:
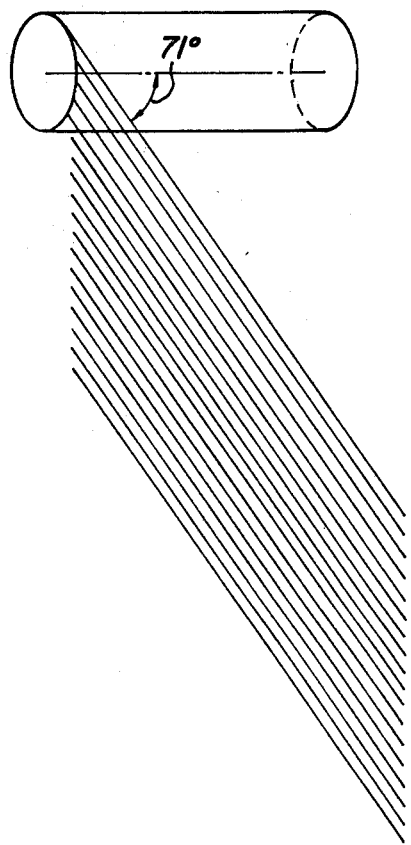

Then, the inclined cut ends of the cords are aligned along one end of the cylindrical barrel as shown in FIG. 6 and helically wound around the cylindrical barrel to obtain helically formed cord arrangement. It is a matter of course that the green case is inflated and then put into a valcanization mold where the green case is heated and vulcanized under pressure.

During the vulcanization, the cord layers are uniformly subjected to tension due to the internal pressure applied in the green case so as to forcedly reduce the cord angle. As a result, there is no risk of the distance between adjacent cords of the axially extending cord layer being irregular, thereby preventing the quality of the marine fender in the circumferential direction from becomming nonuniform.

The above mentioned mode of the internal pressure subjected to the green case is the same as the berthing load subjected to the marine fender when it is used. As a result, there is no risk of the seam of the cords of the circumferentially extending cord layer being subjected to the local load or stress concentration.

As stated hereinbefore, the pneumatic marine fender according to the invention is capable of eliminating a difficult problem which has been encountered with the seam of cords of the circumferentially extending cord layer without requiring any specially precise measures in the manufacturing step and capable of effectively improving the wear resistant property of the marine fender without deteriorating the energy absorption compressive characteristic thereof.

What is claimed is:

1. A pneumatic marine fender composed of cylindrical barrel serving as a shock receiving face, comprising a hollow cylindrical shell formed of rubber or rubber-like elastic material and a composite inner reinforcement composed of two kinds of cord layers comprising an axially extending cord layer substantially covering the end surface of said cylindrical shell and at least two circumferentially extending cord layers whose cords are slightly inclined at an angle of the order of smaller than 30°, preferably 19° with respect to the circumferential line of the cylindrical barrel and symmetrical arranged with respect to the circumferential line of the cylindrical shell in reverse directions and helically wound around the cylindrical shell, the inclined cut ends of said circumferentially extending cords aligned at one end of said cylindrical barrel.

2. A method of manufacturing a cylindrical barrel-shaped pneumatic marine fender comprising a step of forming a hollow cylindrical shell in which an axially extending cord layer including a number of cords toroidally arranged in parallel to a center axis of the cylindrical shell and substantially covering the end surface of said cylindrical shell, a circumferentially extending even number of cord layers having cords slightly inclined at an angle of the order of smaller than 30°, preferably 19° with respect to the circumferential line of the cylindrical barrel and symmetrically arranged with respect to the circumferential line of the cylindrical shell in reverse directions and helically wound around the cylindrical shell, the inclined ends of said circumferentially extending cords being aligned along one end of said cylindrical barrel and inner and outer surface rubber layers are bonded together into the hollow cylindrical shell, and a step of hardening and making the hollow cylindrical shell into one integral body in a vulcanization mold in which the hollow cylindrical shell is put in the vulcanized mold and heated under an inflated condition and vulcanized.

* * * * *